(12) United States Patent
Matsumoto et al.

(10) Patent No.: US 12,185,704 B2
(45) Date of Patent: Jan. 7, 2025

(54) FISHING ROD

(71) Applicant: Shimano Inc., Sakai (JP)

(72) Inventors: Kiyohiko Matsumoto, Sakai (JP); Takahiro Yamanaka, Sakai (JP)

(73) Assignee: Shimano Inc., Sakai (JP)

( * ) Notice: Subject to any disclaimer, the term of this patent is extended or adjusted under 35 U.S.C. 154(b) by 59 days.

(21) Appl. No.: 17/745,145

(22) Filed: May 16, 2022

(65) Prior Publication Data

US 2022/0378028 A1 Dec. 1, 2022

(30) Foreign Application Priority Data

Jun. 1, 2021 (JP) ................................. 2021-092247

(51) Int. Cl.
*A01K 87/00* (2006.01)

(52) U.S. Cl.
CPC .................................. *A01K 87/00* (2013.01)

(58) Field of Classification Search
CPC ...... A01K 87/00; A01K 87/002; A01K 87/02; A01K 87/08; A01K 87/005; A01K 87/007; A01K 87/008; A01K 87/04; A01K 87/06
USPC ...... 43/18.1 R; 156/173, 429, 431, 446, 449, 156/457, 458
See application file for complete search history.

(56) References Cited

U.S. PATENT DOCUMENTS

| | | | | |
|---|---|---|---|---|
| 1,871,985 A * | 8/1932 | Grossenbach | ......... | A01K 87/02 403/333 |
| 2,153,550 A * | 4/1939 | Cowdery | ............... | A63B 53/12 473/323 |
| 3,067,537 A * | 12/1962 | Gregory | ................. | A01K 87/00 43/25.2 |
| 3,596,921 A * | 8/1971 | Bruckl | .................... | A63C 11/22 280/819 |
| 4,014,129 A * | 3/1977 | Capra | .................... | A01K 87/08 43/25 |
| 5,159,775 A * | 11/1992 | Sutula, Jr. | .............. | A01K 87/08 294/58 |
| 5,231,783 A * | 8/1993 | Utsuno | ................. | B29C 70/326 43/18.5 |
| 6,145,237 A * | 11/2000 | Young | .................... | A01K 87/00 43/18.1 R |
| 6,513,277 B1 * | 2/2003 | Morimoto | ............. | B29C 53/585 43/18.1 R |

FOREIGN PATENT DOCUMENTS

| | | | | | |
|---|---|---|---|---|---|
| CN | | 203986477 U | * | 12/2014 | |
| CN | | 207341329 U | * | 5/2018 | |
| CN | | 108851407 A | * | 11/2018 | ............. A45B 19/08 |

(Continued)

OTHER PUBLICATIONS

JP-2004057731-A Translation (Year: 2004).*

(Continued)

*Primary Examiner* — Darren W Ark
*Assistant Examiner* — Katelyn T Truong
(74) *Attorney, Agent, or Firm* — United IP Counselors, LLC

(57) ABSTRACT

A fishing rod is disclosed. The fishing rod includes a rod body. The rod body has a first cylindrical part. The first cylindrical part has a lower portion formed by a concave outer surface that is recessed and a convex inner surface that protrudes convexly along the concave outer surface.

14 Claims, 16 Drawing Sheets

(56) References Cited

FOREIGN PATENT DOCUMENTS

| | | | | |
|---|---|---|---|---|
| JP | 05180234 | A | * | 7/1993 |
| JP | H05252852 | A | * | 10/1993 |
| JP | 2542352 | B2 | * | 10/1996 |
| JP | 2727538 | B2 | * | 11/1998 |
| JP | 2004057731 | A | * | 2/2004 |
| JP | 2010-252813 | A | | 11/2010 |
| JP | 2011050254 | A | * | 3/2011 |

OTHER PUBLICATIONS

JP-2011050254-A Translation (Year: 2011).*
JP-2542352-B2 Translation (Year: 1996).*
JP-05180234-A Translation (Year: 1993).*
JP-H05252852-A Translation (Year: 1993).*

* cited by examiner

Related Art

FISHING ROD

CROSS-REFERENCE TO RELATED APPLICATIONS

This application claims priority to Japanese Patent Application No. 2021-092247, filed Jun. 1, 2021. The contents of that application are incorporated by reference herein in their entirety.

TECHNICAL FIELD

The present invention relates to a fishing rod.

BACKGROUND ART

Fishing rods have various demands in the market, such as a cross-sectional shape which is oval, inverted triangle or substantially inverted pentagon, steep expansion of a diameter in the axial direction, and molding of a bulged section, depending on balance, tone, ease of grip, and ease of placing a reel thereon.

In response to these demands, a method of manufacturing a fishing rod is described in Japanese Patent No. 2542352. The method includes winding a prepreg sheet for forming a fishing rod several times around a core of the required shape (having a non-circular bulged section) with fibers aligned in a certain direction in a resin material. After covering a heat-shrinkable tube to the wound portion with the prepreg sheet for forming a fishing rod in the bulged section of the core, a binding tape is spirally bound so that the tape partially overlaps the entire length of the wound portion with the prepreg sheet for forming a fishing rod, the tape is formed to follow the outline of the core, and then heat-cured by heating and baking, or the like. After heat-curing, the binding tape is removed and the core is pulled out to form a fishing rod with a shape following the outline of the core.

In addition, according to the method of manufacturing a fishing rod described in Japanese Patent Application Publication No. 2010-252813, a silicon rubber sheet or a fluororesin sheet is used to provide a recess on the outer surface.

As described in Japanese Patent No. 2542352, when a prepreg sheet for forming a fishing rod is wound around and heat-cured for forming, a bonding tape needs to be bound to follow the shape of the core. Therefore, it is possible to form a fishing rod with a bulged section in the core and the bulged section along the shape of the core, as shown in Japanese Patent No. 2542352, but it is not possible to form a fishing rod with a concave shape.

The cross section of the tubular member shown in FIG. 3 or 6 of Japanese Patent Application Publication No. 2010-252813 is shown in FIG. 16. While it is possible to vary the thickness of a tubular member such as a fishing rod and provide a recess 500 only on the outer surface as shown in FIG. 16, it is not possible to provide a convex inner surface that protrudes into the inner circumference along the recess 500 formed on the outer surface.

BRIEF SUMMARY

The present invention is to provide a fishing rod with a complex shape having, along a core, a concave outer surface with a concave recess and a convex inner surface protruding convexly inward along the concave outer surface.

According to an aspect of the present invention, a fishing rod includes a rod body having a first cylindrical part, the first cylindrical part having a lower portion formed by a concave outer surface that is recessed and a convex inner surface that protrudes convexly along the concave outer surface.

According to another aspect of the present invention, a fishing rod includes a rod body having a first cylindrical part, wherein the first cylindrical part has a radial lower portion formed by a first concave outer surface that is recessed inwardly in a radial direction and a first convex inner surface that protrudes convexly inwardly in the radial direction along the first concave outer surface.

Preferably, the first cylindrical part has a first smooth portion on the first concave outer surface.

Preferably, the first cylindrical part has a second smooth portion at least partially on an outer surface except for the first concave outer surface.

Preferably, the first cylindrical part has a first spiral uneven portion at least partially on the outer surface except for the first concave outer surface.

According to another aspect of the present invention, a fishing rod includes a rod body having a first cylindrical part, in which the first cylindrical part has an axial lower portion formed by a second concave outer surface that is recessed toward a rod tail side in an axial direction and a second convex inner surface that protrudes convexly along the second concave outer surface toward the rod tail side in the axial direction.

Preferably, the first cylindrical part has a third smooth portion on the second concave outer surface.

Preferably, the first cylindrical part has a fourth smooth portion at least partially on an outer surface except for the second concave outer surface.

Preferably, the first cylindrical part has a second spiral uneven portion at least partially on the outer surface except for the second concave outer surface.

According to another aspect of the present invention, a fishing rod includes a rod body having a first cylindrical part, and the first cylindrical part has a radial lower portion formed by a first concave outer surface that is recessed inwardly in a radial direction and a first convex inner surface that protrudes convexly inwardly in the radial direction along the first concave outer surface, and an axial lower portion formed by a second concave outer surface that is recessed toward a rod tail side in an axial direction and a second convex inner surface that protrudes convexly along the second concave outer surface toward the rod tail side in the axial direction.

The fishing rod further includes a second cylindrical part disposed adjacent to the first cylindrical part in the axial direction and having a third spiral uneven portion on an outer surface.

As described above, in accordance with the present invention, a fishing rod with a complex shape along the core can be obtained, which has a concave outer surface with a recess and a convex inner surface that protrudes convexly inward along the concave outer surface.

DETAILED DESCRIPTION

The following is a description of a fishing rod according to one embodiment of the present invention, with reference to the drawings. An axial direction of the fishing rod is a front-back direction, with a rod-tip side being a front side and a rod-tail side being a rear side. The fishing rod has a rod body. The rod body can be provided with a fishing line guide, not shown, or without a fishing line guide. The rod body is made of fiber-reinforced plastic, for example. The rod body is hollow, at least in part, and is formed from a prepreg sheet of fiber-reinforced resin. The rod body consists of one or more cylindrical parts.

Figure 1A:
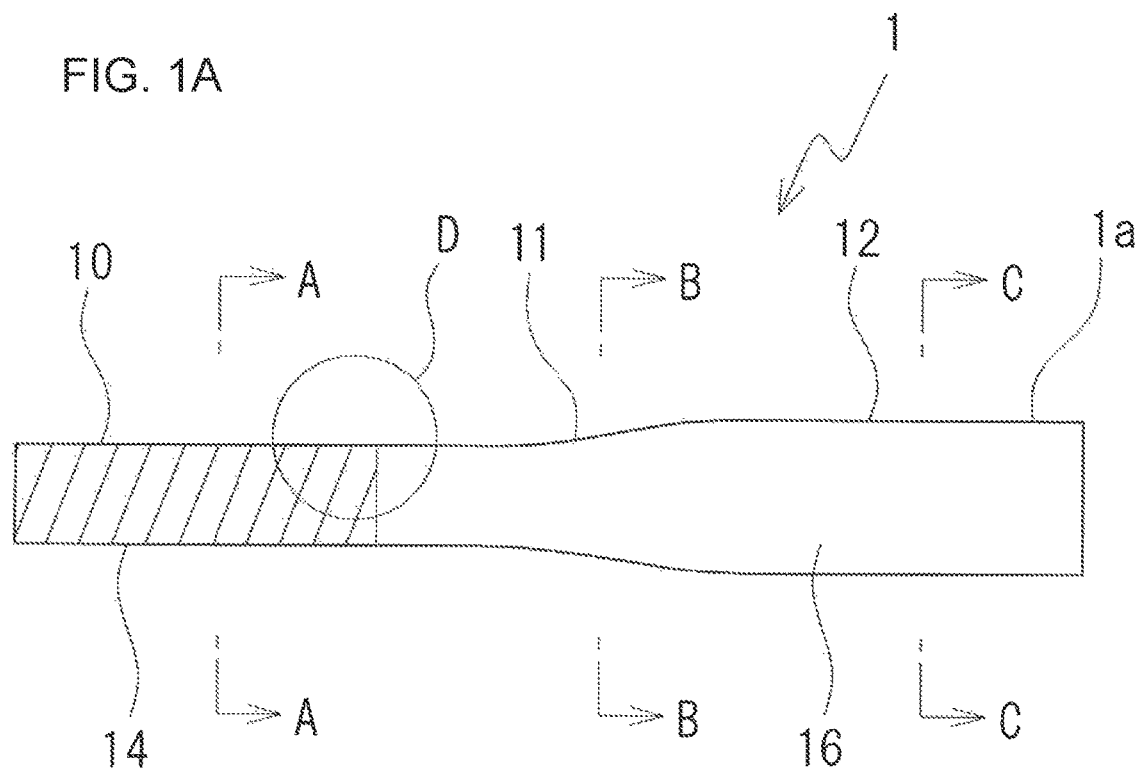
FIGS. 1A and 1B show the main part of a fishing rod according to one embodiment of the present invention, with FIG. 1A being a front view and FIG. 1B being a cross-sectional view.
Figure 1B:
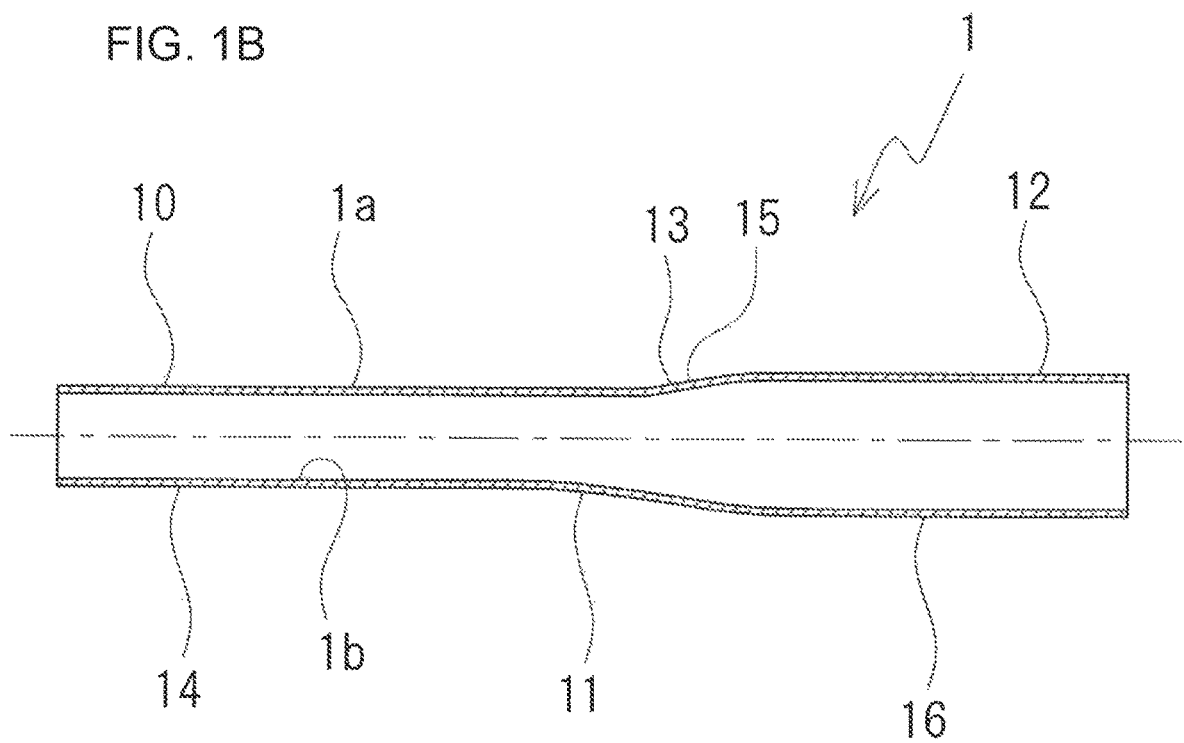
Figure 2A:
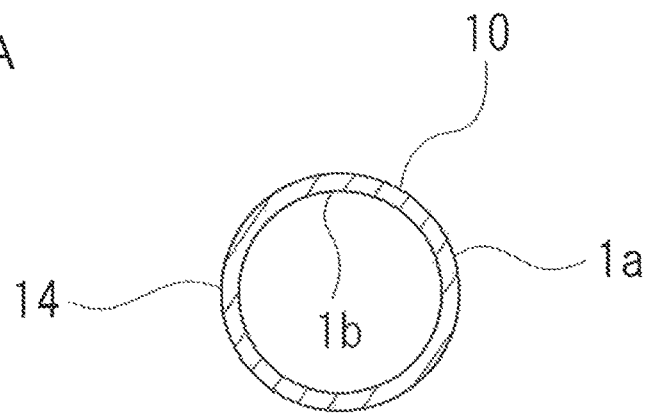
FIG. 2A is the A-A end view of FIG. 1A.
Figure 2B:
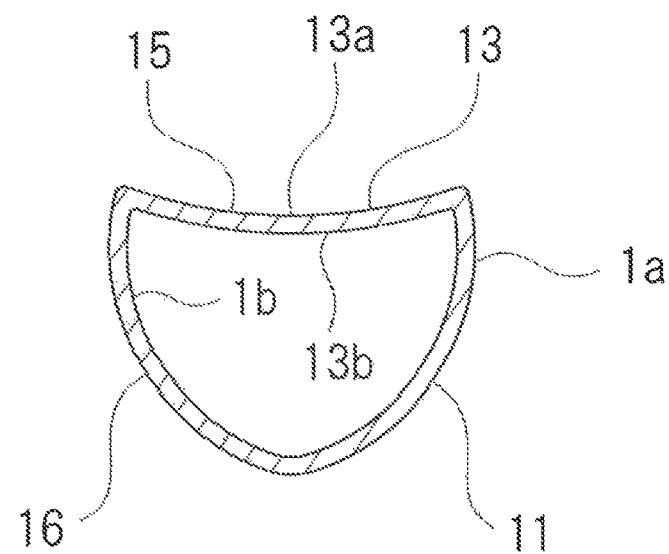
FIG. 2B is the B-B end view of FIG. 1A.
Figure 2C:
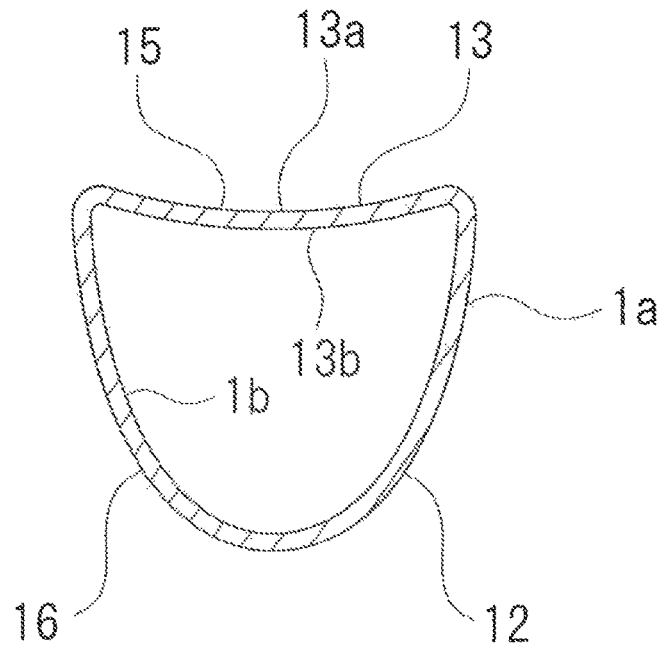
FIG. 2C is the C-C end view of FIG. 1A.
Figure 3:
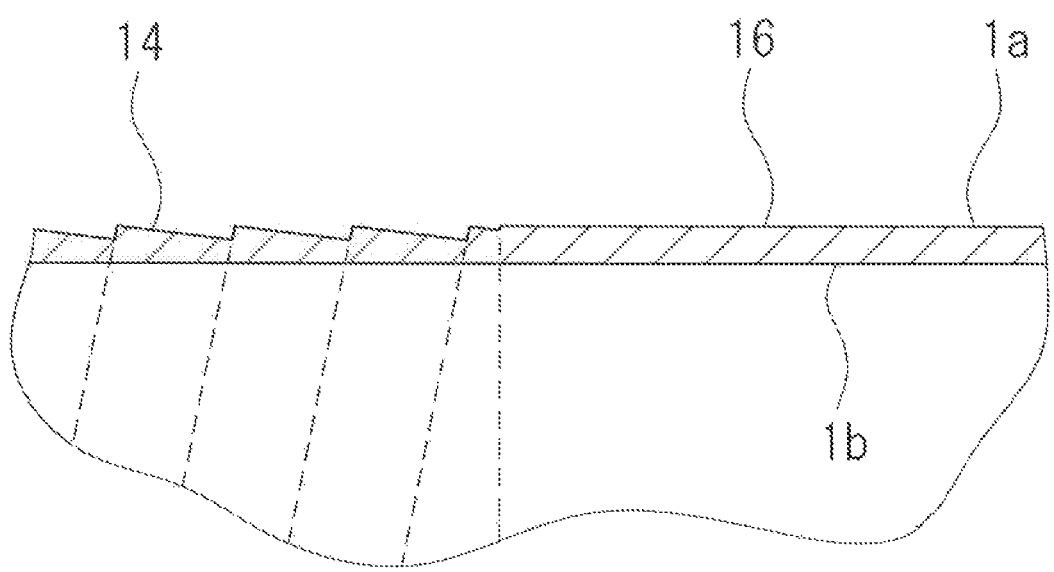
FIG. 3 is an enlarged view of part D in FIG. 1A.

FIGS. 1A and 1B show a first cylindrical part 1. The first cylindrical part 1 is located at the rearmost end of the rod body, i.e., at the tail end of the rod. The first cylindrical part 1 is cylindrical and hollow in its entirety. The first cylindrical part 1 has an outer surface 1a and an inner surface 1b. The first cylindrical part 1 has, in order from the front side to the rear side, a small diameter portion 10, an enlarged diameter portion 11, and a large diameter portion 12. The small diameter portion 10 is circular in cross section and cylindrical, as shown in FIG. 2A. The large diameter portion 12 is an inverted triangle in cross section, as shown in FIG. 2C, and serves as a rear grip portion to be gripped by a user. As shown in FIG. 2B, the enlarged diameter portion 11 has a shape that gradually expands toward the rear side and also gradually transforms from a circular to an inverted triangle toward the rear side in cross-sectional view.

The first cylindrical part 1 has a radial lower portion 13. A first concave outer surface 13a of the radial lower portion 13 is provided on the outer surface 1a of the first cylindrical part 1. The first concave outer surface 13a of the radial lower portion 13 is concave inwardly in a radial direction. A first convex inner surface 13b of the radial lower portion 13 is provided on the inner surface 1b of the first cylindrical part 1. The first convex inner surface 13b protrudes convexly inwardly in the radial direction along the first concave outer surface 13a. The radial lower portion 13 is provided in the enlarged diameter portion 11 and the large diameter portion 12.

The outer surface 1a of the first cylindrical part 1 is provided with a first spiral uneven portion 14, a first smooth portion 15, and a second smooth portion 16. The first spiral uneven portion 14 is formed by a tightening tape 103 (forming tape) when baking the first cylindrical part 1, and is a tape mark. The first spiral uneven portion 14 is provided in the small diameter portion 10, and is provided on the front portion of the outer surface of the small diameter portion 10.

The first smooth portion 15 and the second smooth portion 16 are smooth surfaces with virtually no tape mark. The first smooth portion 15 and the second smooth portion 16 are provided on the rear portion of the small diameter portion 10, the enlarged diameter portion 11, and at least the front portion (continuous with the enlarged diameter portion 11) of the large diameter portion 12. The first smooth portion 15 is provided on the first concave outer surface 13a of the radial lower portion 13 among the outer surface 1a of the rear portion of the small diameter portion 10, the enlarged portion 11 and the large diameter portion 12. The second smooth portion 16 is provided on the entire outer surface 1a, excluding the first concave outer surface 13a, among the outer surface 1a of the rear portion of the small diameter portion 10, the enlarged portion 11 and the large diameter portion 12. That is, the outer surface 1a of the rear portion of the small diameter portion 10, the enlarged portion 11, and the large diameter portion 12 are composed of the first smooth portion 15 and the second smooth portion 16.

Figure 4A:
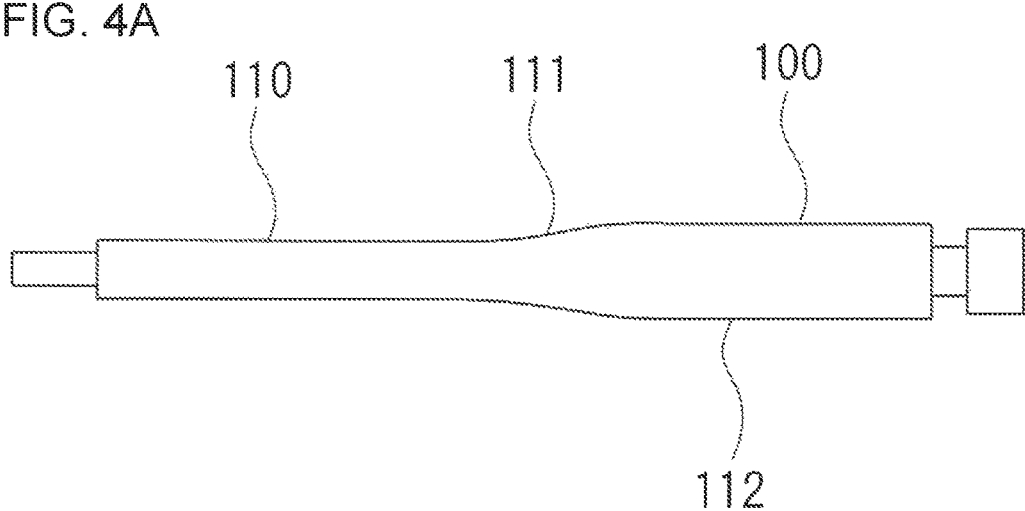
FIGS. 4A through 4C show a manufacturing method of the main part of the fishing rod.
Figure 4B:
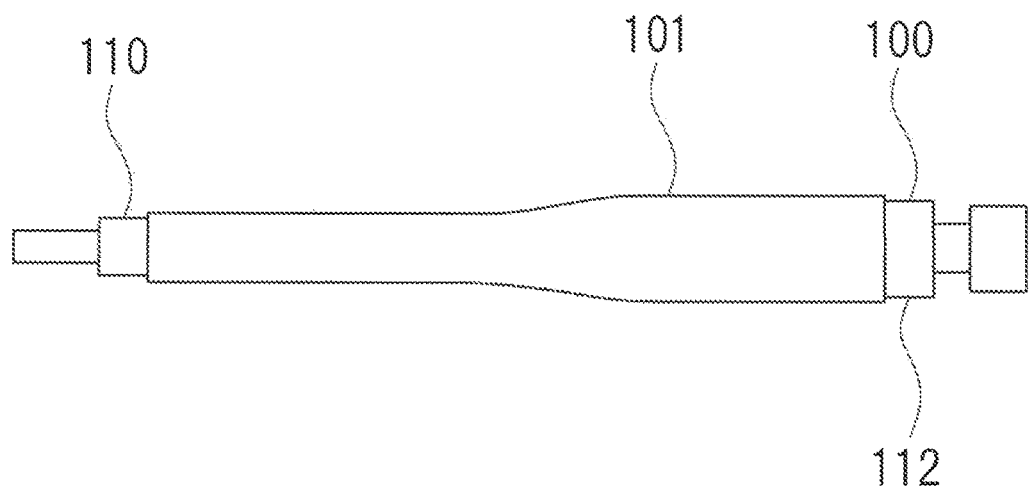

The first cylindrical part 1 is manufactured, for example, as follows. An overview of the manufacturing process of the first cylindrical part 1 is shown in FIGS. 4A-4C, 5A-5C, 6 and 7. As shown in FIG. 4B, a prepreg sheet 101 is wound around a mandrel 100 shown in FIG. 4A.

The mandrel 100 has a core small-diameter portion 110, a core enlarged-diameter portion 111, and a core large-diameter portion 112, in order from the front side to the rear side, along the shape of the first cylindrical part 1.

Figure 7:
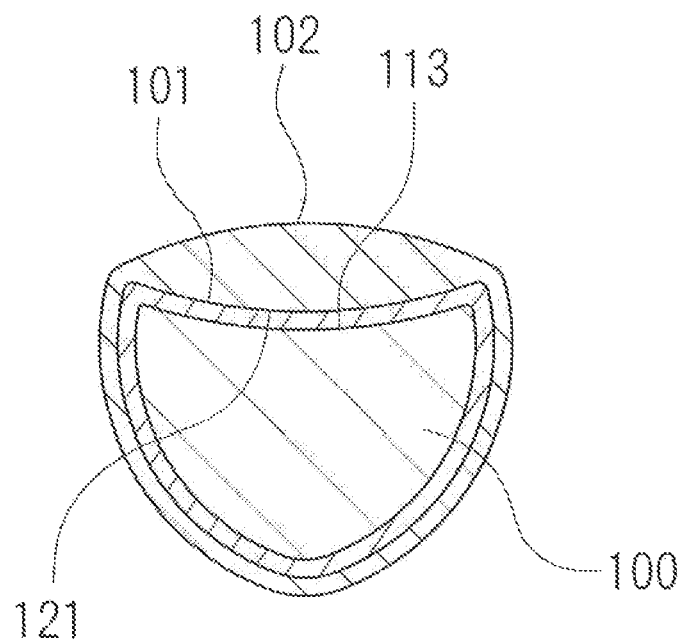
FIG. 7 is the E-E end view of FIG. 4C.

As shown in FIG. 7, the core enlarged-diameter portion 111 and the core large-diameter portion 112 have a core lower portion 113 that corresponds to the shape of the first convex inner surface 13b of the radial lower portion 13.

Figure 4C:
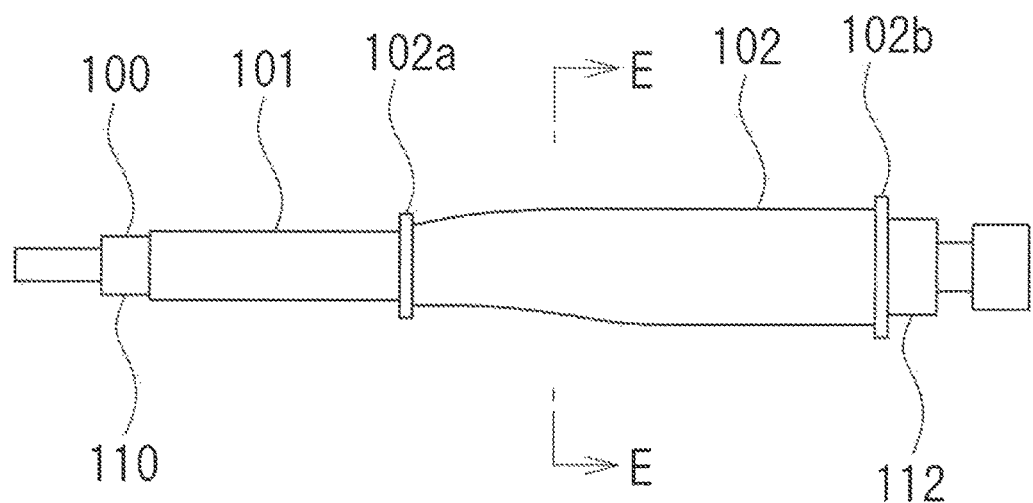
Figure 5A:
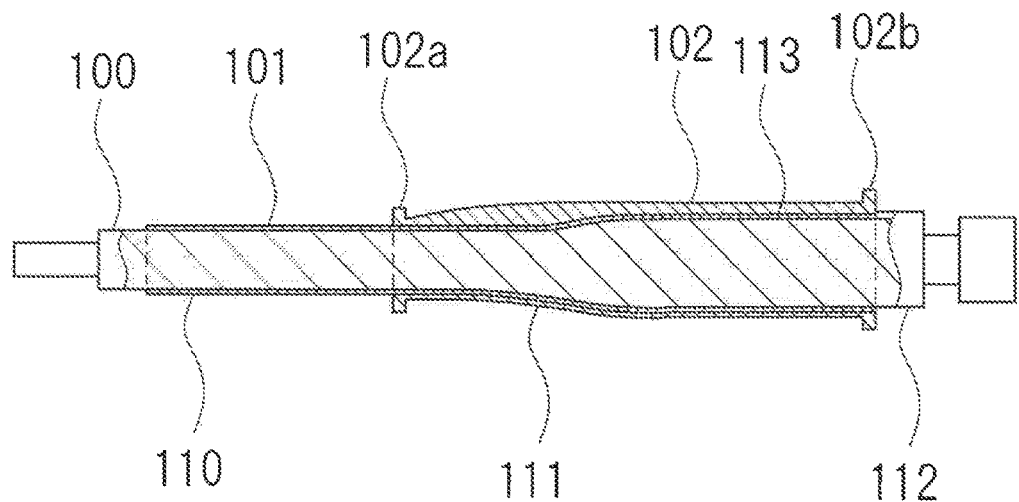
FIGS. 5A through 5C show a manufacturing method of the main part of the fishing rod.
Figure 5B:
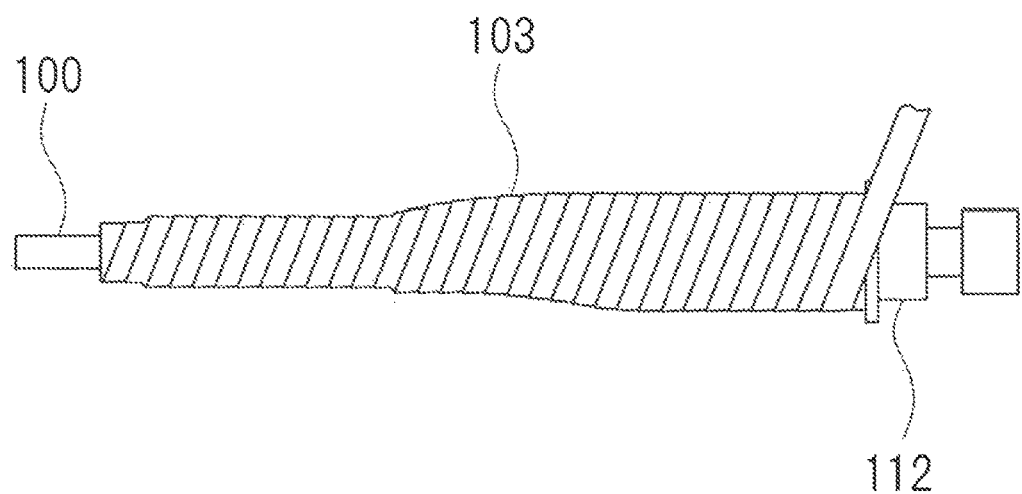
Figure 5C:
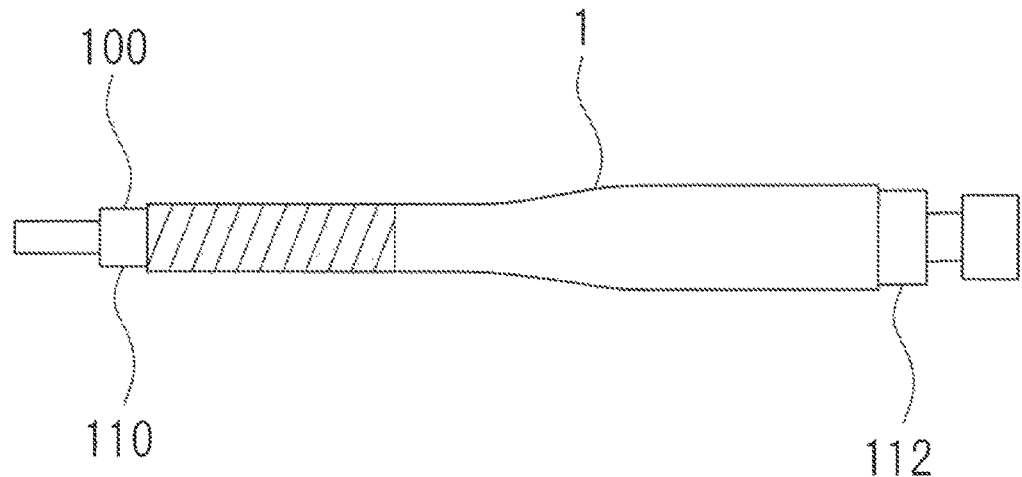
Figure 6:
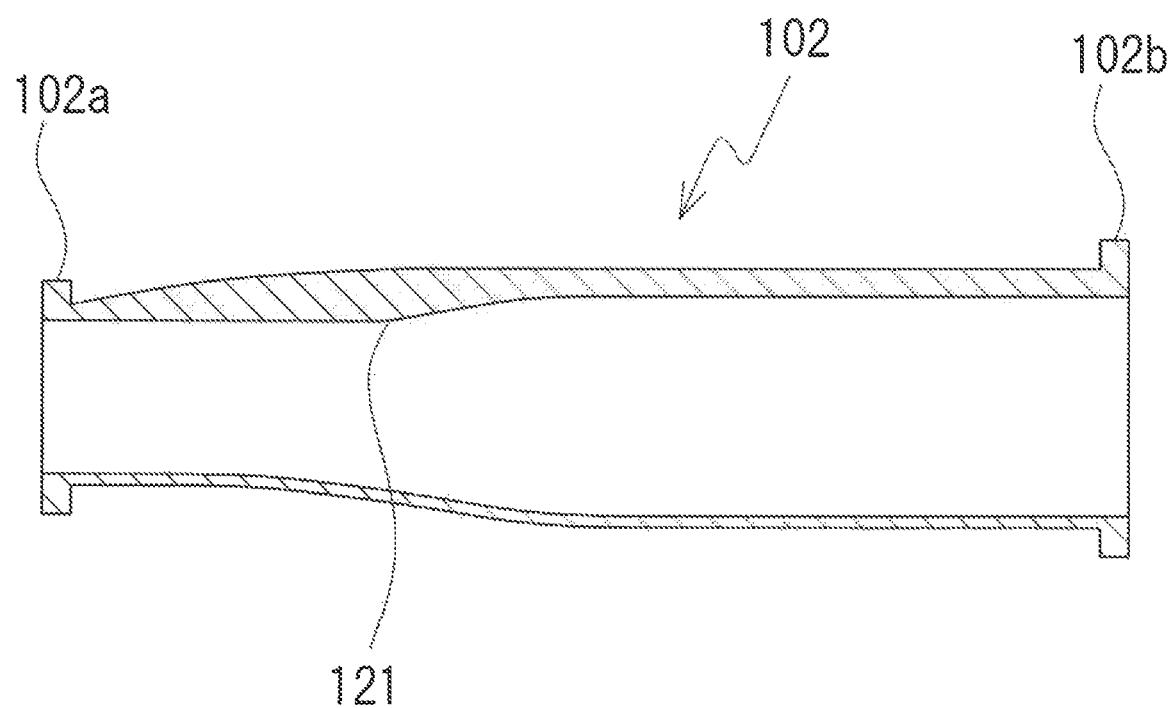
FIG. 6 shows a cross-sectional view of a silicon tube used in the manufacturing method.

The silicon tube 102 is fitted onto the outer side of the prepreg sheet 101 in the radial direction as shown in FIG. 4C and FIG. 5A. The silicone tube 102 is tubular and formed by molding. The silicone tube 102 preferably has a first flange 102a and a second flange 102b on the outer circumferences of the front end and the rear end, respectively. The inner surface of the silicone tube 102 has a boss 121 corresponding to the first concave outer surface 13a of the radial lower portion 13. The silicone tubing 102 is installed from the rear portion of the small diameter portion 10 to the area corresponding to the large diameter portion 12. The tightening tape 103 is wound around the entire prepreg sheet 101 on the mandrel 100, including the silicone tube 102, as shown in FIG. 5B. The tightening tape 103 is wound around from the front side to the rear side. After heating and firing, the tightening tape 103 is removed as shown in FIG. 5C, and the heat-fired prepreg sheet 101 is removed from the mandrel 100, and the silicon tube 102 is also removed. Among the outer surface of prepreg sheet 101, the area where the silicone tube 102 is not attached becomes the first spiral uneven portion 14 formed by the tightening of the tightening tape 103, and the area where the silicone tube 102 is attached becomes the first smooth portion 15 and the second smooth portion 16.

By winding the tightening tape 103 around the silicone tube 102, the tightening force by the tightening tape 103 acts on the prepreg sheet 101 through the silicone tube 102. Therefore, even if the mandrel 100 is provided with the core lower portion 113, a tightening force applied from a boss 121 formed on the inner circumference of the silicon tube 1. After heating and baking, the first concave outer surface 13a is formed on the outer circumference of the prepreg sheet 101 in accordance with the shape of the boss 121 on the inner circumference of the silicone tube 102, and the first convex inner surface 13b is also formed in accordance with the shape of the core lower portion 113. In this manner, the first cylindrical part 1 having the radial lower portion 13 is formed.

The radial lower portion 13 in the first cylindrical part 1 provides a large circumferential hooking force when it is gripped, which increases the gripping force. In addition, the first smooth portion 15 and the second smooth portion 16 facilitate painting in those areas, provide good aesthetics, and allows to skip a polishing process. In addition, the first spiral uneven portion 14, the first smooth portion 15 and the second smooth portion 16 are provided, a contrast is created among the first spiral uneven portion 14, the first smooth portion 15 and the second smooth portion 16, which achieves unique aesthetic appeal.

Figure 8:
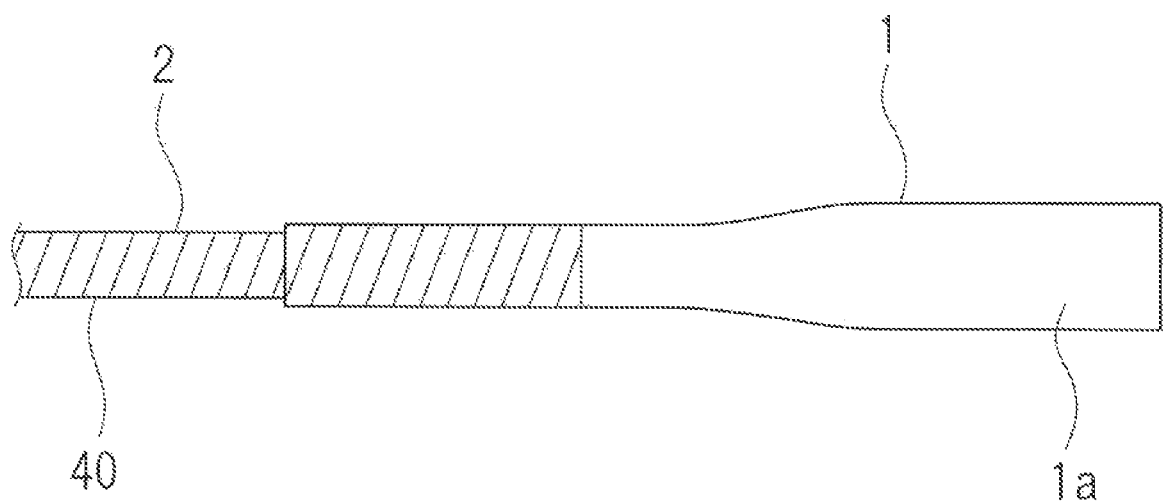
FIG. 8 is a front view of the main part of a fishing rod according to another embodiment of the present invention.

A second cylindrical part 2 can be joined to the front or rear side of the first cylindrical part 1. FIG. 8 shows an example of a configuration in which the second cylindrical part 2 is joined to the front of the first cylindrical part 1. The second cylindrical part 2 can be adhesively fixed to the first cylindrical part 1. Alternatively, the second cylindrical part 2 can be axially movable with respect to the first cylindrical part 1, i.e., it can be accommodated in the first cylindrical part 1. The second cylindrical part 2 can be circular in cross section along its entire length, and the outer surface of the second cylindrical part 2 can be provided with a third spiral uneven portion 40.

Figure 9A:
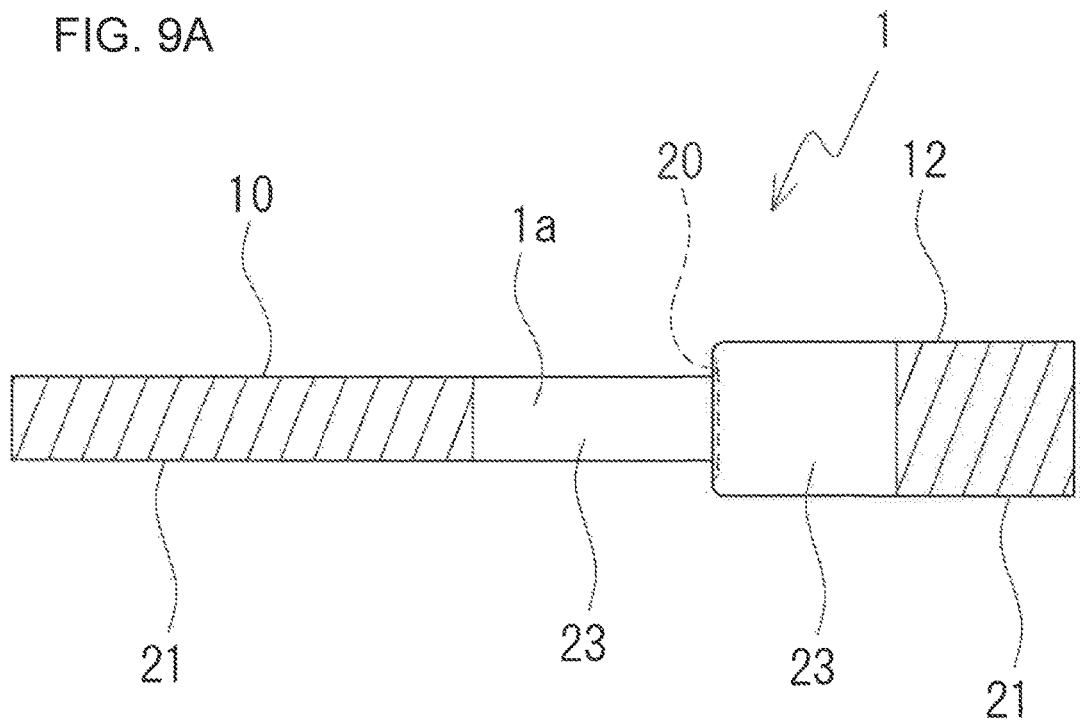
FIGS. 9A and 9B show the main part of a fishing rod in another embodiment according to the present invention, with FIG. 9A being a front view and FIG. 9B being a cross-sectional view.
Figure 9B:
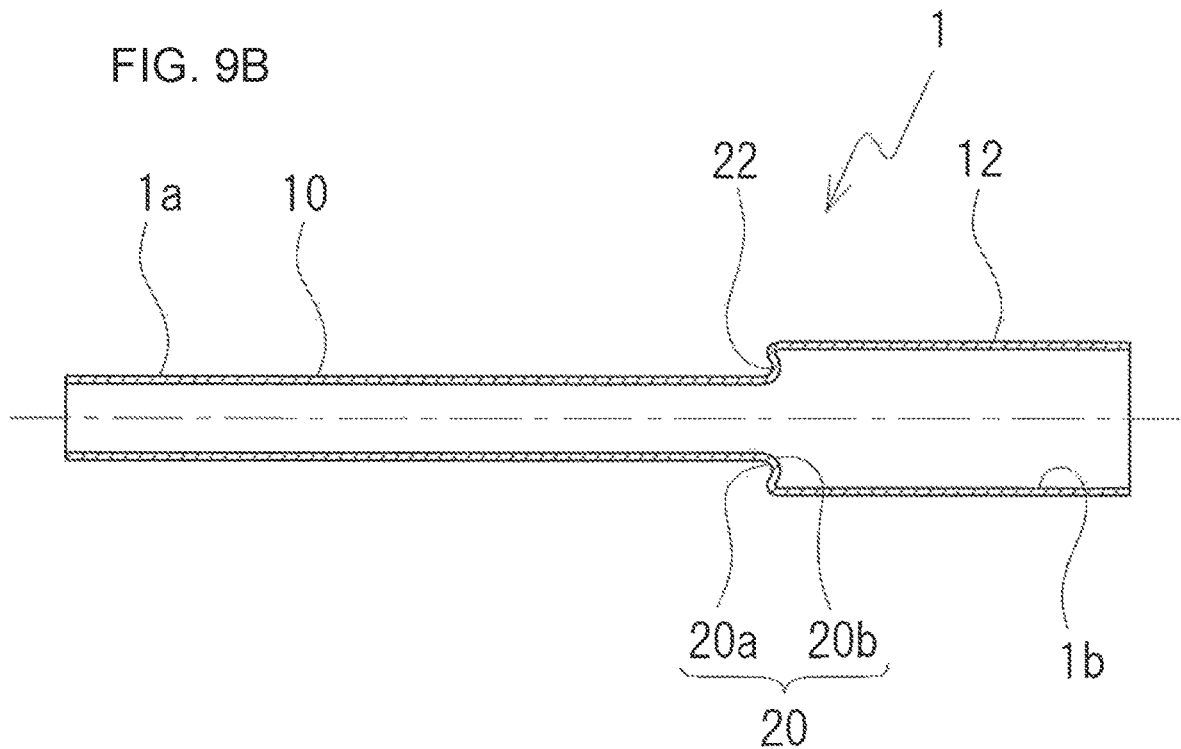

A fishing rod according to another embodiment will be described with reference to FIGS. 9A, 9B, 10A-10C, 11A-11C and 12. The same configuration as in the above embodiment is omitted from the detailed description. The first cylindrical part 1 in this embodiment has, in order from the front side, the small diameter portion 10, the large diameter portion 12, and an axial lower portion 20, as shown in FIGS. 9A and 9B. The cross-sectional shape of the first cylindrical part 1 is circular along its entire length. The axial lower portion 20 is located at the boundary between the small diameter portion 10 and the large diameter portion 12. The large diameter portion 12 is one step larger in diameter than the small diameter portion 10 and has a step shape at the axial lower portion 20. A second concave outer surface 20a of the axial lower portion 20 is recessed toward the rod-tail end in the axial direction. A second convex inner surface 20b of the axial lower portion 20 protrudes convexly along the second concave outer surface 20a toward the rod-tail end in the axial direction.

The outer surface 1a of the first cylindrical part 1 is provided with a second spiral uneven portion 21, a third smooth portion 22, and a fourth smooth portion 23. The second spiral uneven portion 21 is a tape mark similar to the first spiral uneven portion 14. The third and fourth smooth portions 22 and 23 are smooth surfaces, as are the first and second smooth portions 15 and 16.

The second spiral uneven portion 21 is provided in the small diameter portion 10 and the large diameter portion 12. More specifically, the second spiral uneven portion 21 is provided in the front portion of the small diameter portion 10 and the rear portion of the large diameter portion 12. The third smooth portion 22 is provided on the second concave outer surface 20a of the axial lower portion 20. The fourth smooth portion 23 is provided on the entire area of the outer surface 1a of the small diameter portion 10 where the second spiral uneven portion 21 is not provided, and on the entire area of the outer surface 1a of the large diameter portion 12 where the second spiral uneven portion 21 is not provided. That is, the fourth smooth portion 23 is provided on the rear portion of the small diameter portion 10 and on the front portion of the large diameter portion 12.

Figure 10A:
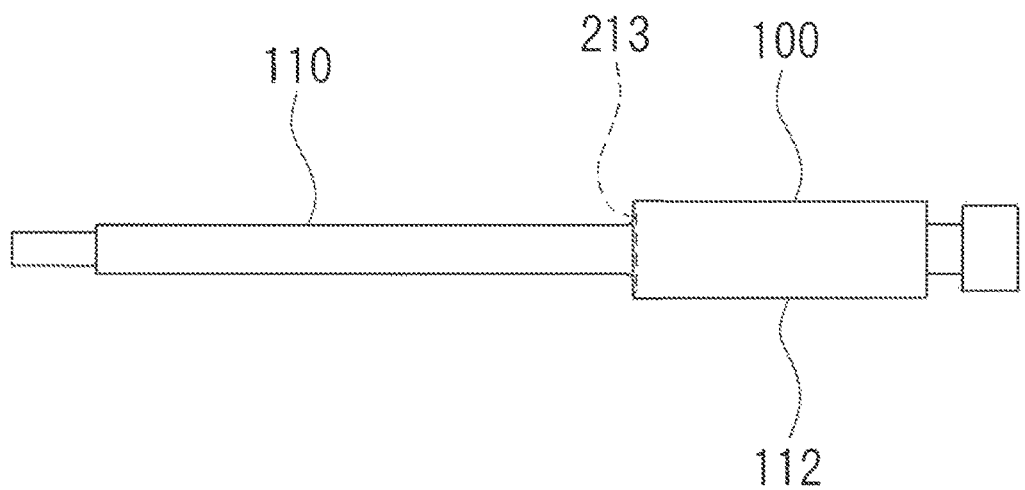
FIGS. 10A through 10C show the manufacturing method of the main part of the fishing rod.
Figure 10B:
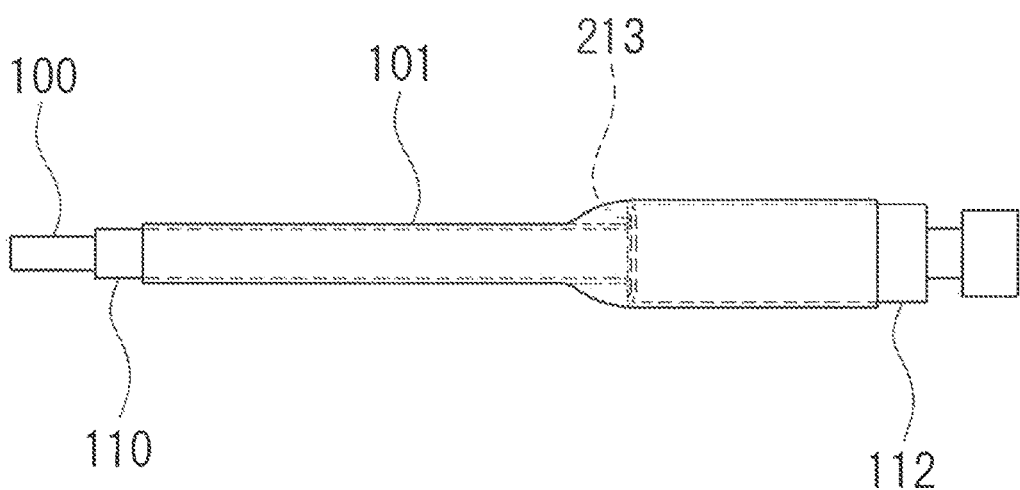

An overview of the manufacturing process for the first cylindrical part 1 is shown in FIGS. 10A-10C, 11A-11C and 12. As shown in FIGS. 10A and 10B, the prepreg sheet 101 is wound around the mandrel 100. As shown in FIG. 10A, the mandrel 100 has the core small-diameter portion 110 and the core large-diameter portion 112, in order from the front side to the rear side, along the shape of the first cylindrical part 1. Between the core small-diameter portion 110 and the core large-diameter portion 112, a core lower portion 213 is formed with a shape corresponding to the shape of the first convex inner surface 20b of the axial lower portion 20.

Figure 10C:
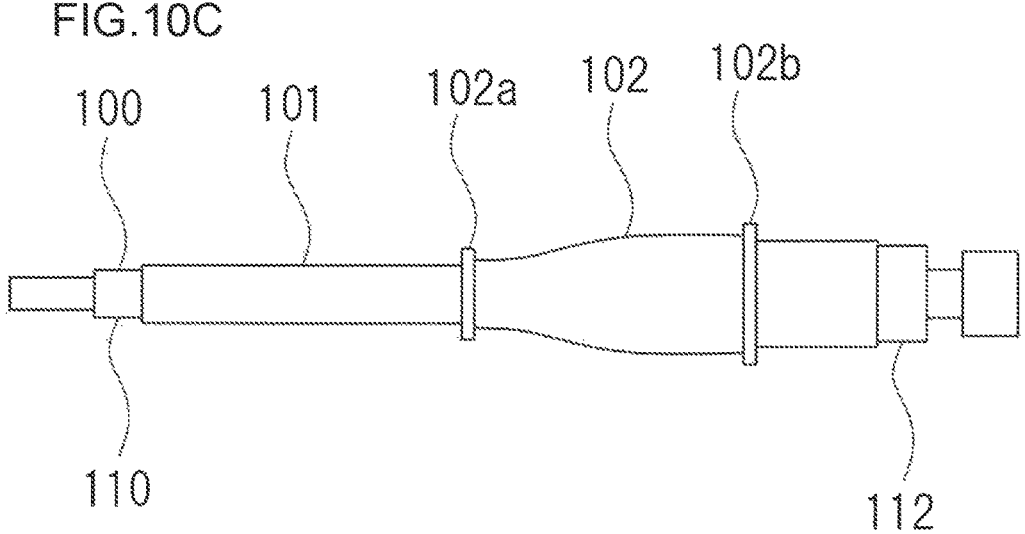
Figure 11A:
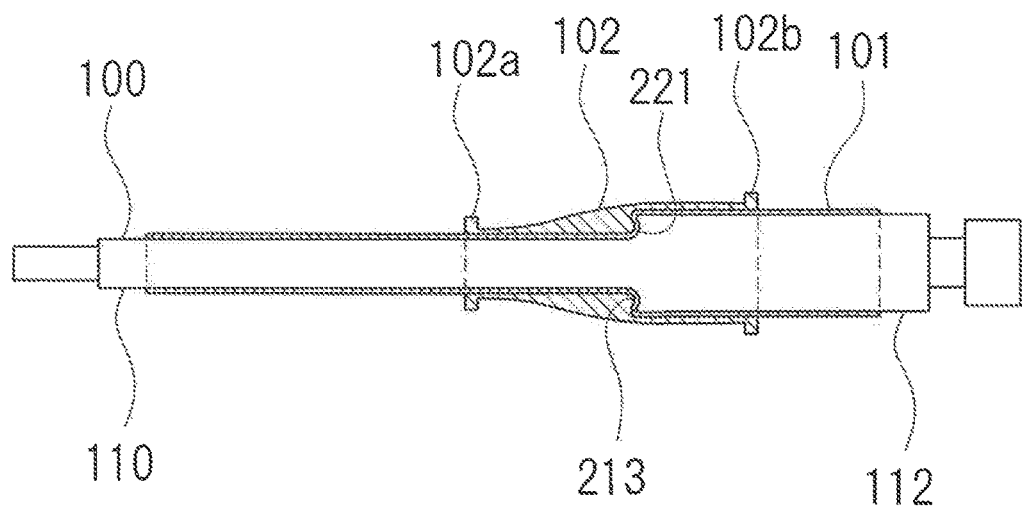
FIGS. 11A through 11C show the manufacturing method of the main part of the fishing rod.
Figure 11B:
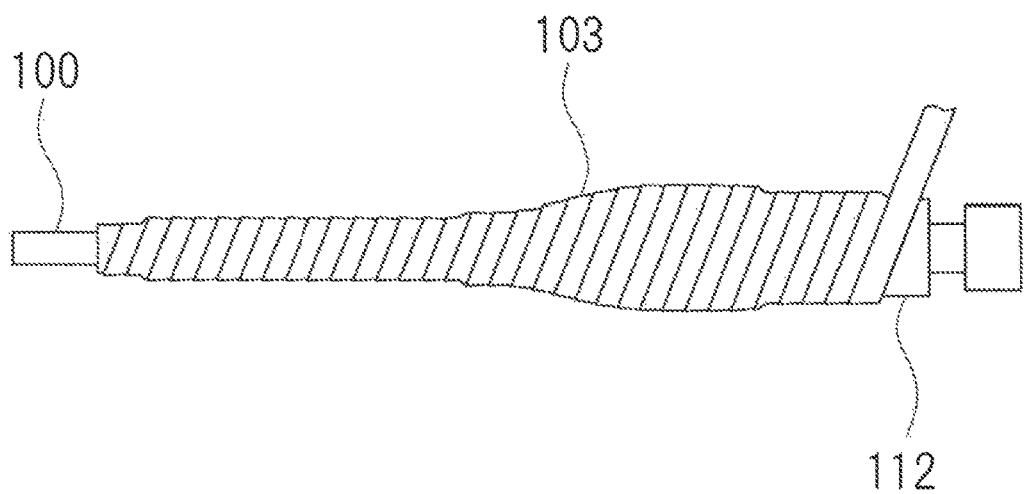
Figure 11C:
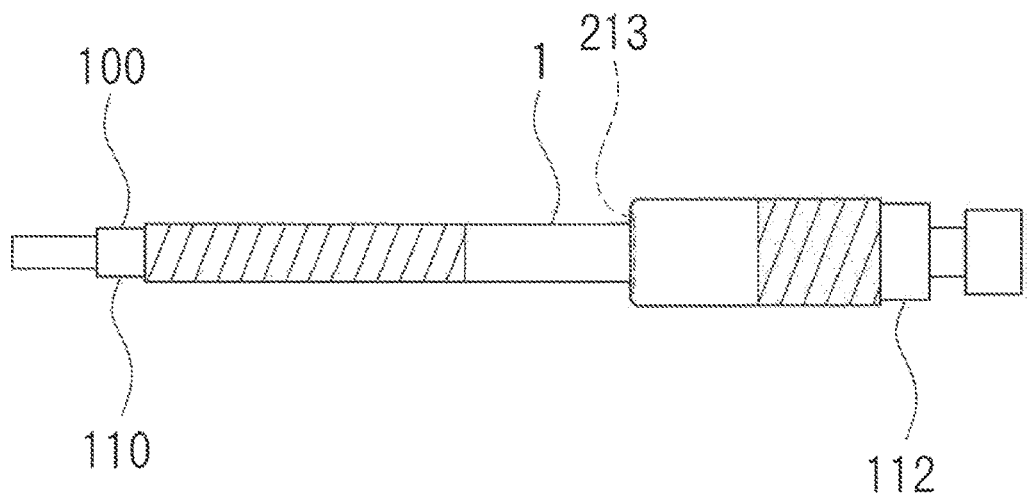
Figure 12:
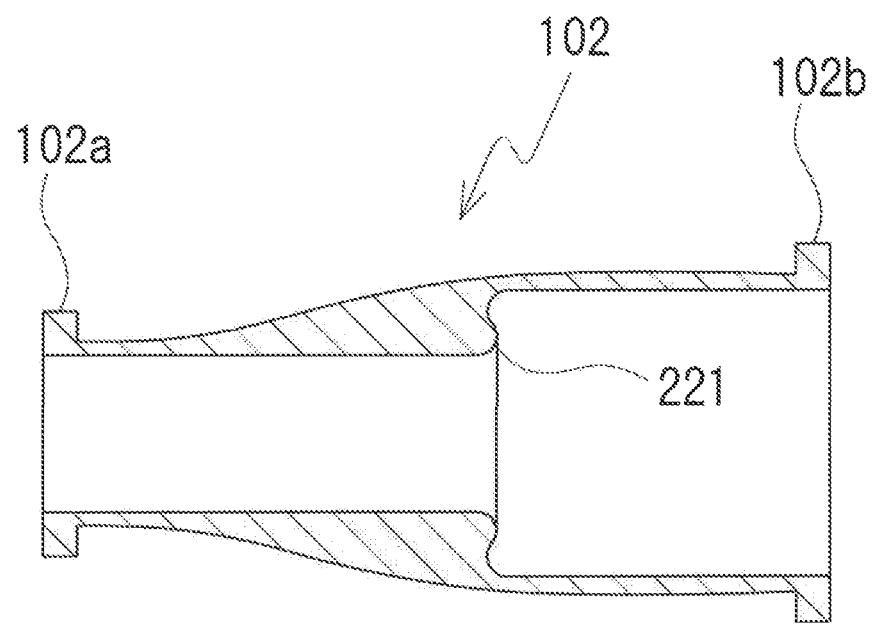
FIG. 12 shows a cross-sectional view of a silicon tube used in the manufacturing method.

The silicon tube 102 is fitted onto the radially outer side of the prepreg sheet 101 wound around the mandrel 100 as shown in FIGS. 10C and 11A. The inner circumference of the silicone tube 102 has a boss 221 corresponding to the second concave outer surface 20a of the axial lower portion 20. The silicone tube 102 is attached to the area from the rear portion of the small diameter portion 10 to the front portion of the large diameter portion 12. The tightening tape 103 is wound around the silicone tube 102 as shown in FIG. 11B. After heating and firing, as shown in FIG. 11C, remove the tightening tape 103, remove the heat-fired prepreg sheet 101 from the mandrel 100, and also remove the silicon tube 102. Among the outer surface of the prepreg sheet 101, the area where the silicone tube 102 is not attached becomes the second spiral uneven portion 21, and the area where the silicone tube 102 is attached becomes the third smooth portion 22 and the fourth smooth portion 23.

By winding the tightening tape 103 around the silicone tube 102, the tightening force by the tightening tape 103 acts on the prepreg sheet 101 through the silicone tube 102. Therefore, even if the mandrel 100 has the core lower portion 213, a tightening force is applied by the boss 221 provided on the inner circumference of the silicone tube 102. After heating and firing, the first concave outer surface 20a is formed on the outer circumference of the prepreg sheet 101 in accordance with the shape of the boss 221 formed on the inner circumference of the silicone tube 102, and the first convex inner surface 20b is formed in accordance with the shape of the core lower portion 213. In this manner, the first cylindrical part 1 having the axial lower portion 20 is formed. With the axial lower portion 20, a user's hand, for example, is caught at that portion, which restricts the axial movement of the hand and provides a large gripping force.

Figure 13A:
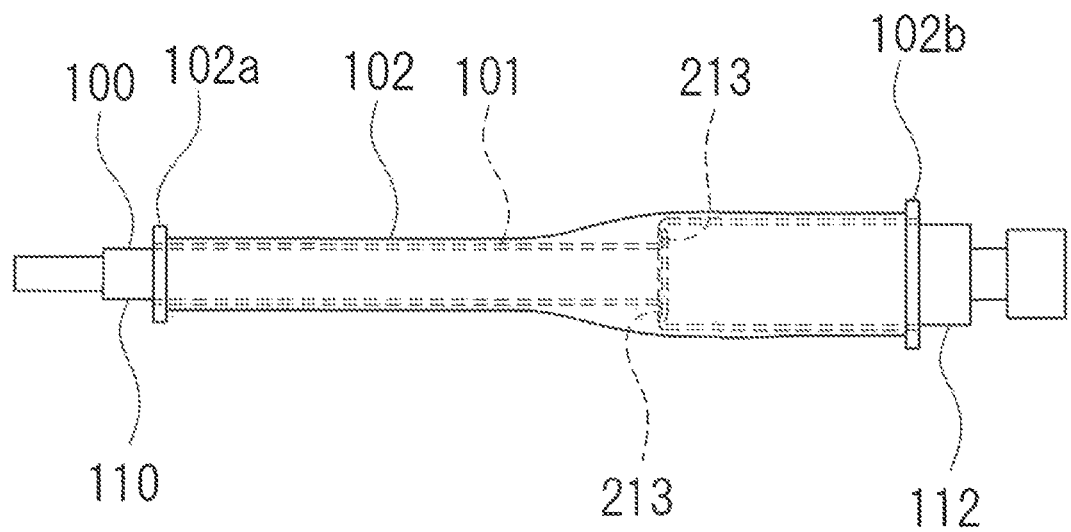
FIGS. 13A and 13B show the method of manufacturing the main part of a fishing rod according to another embodiment of the present invention.
Figure 13B:
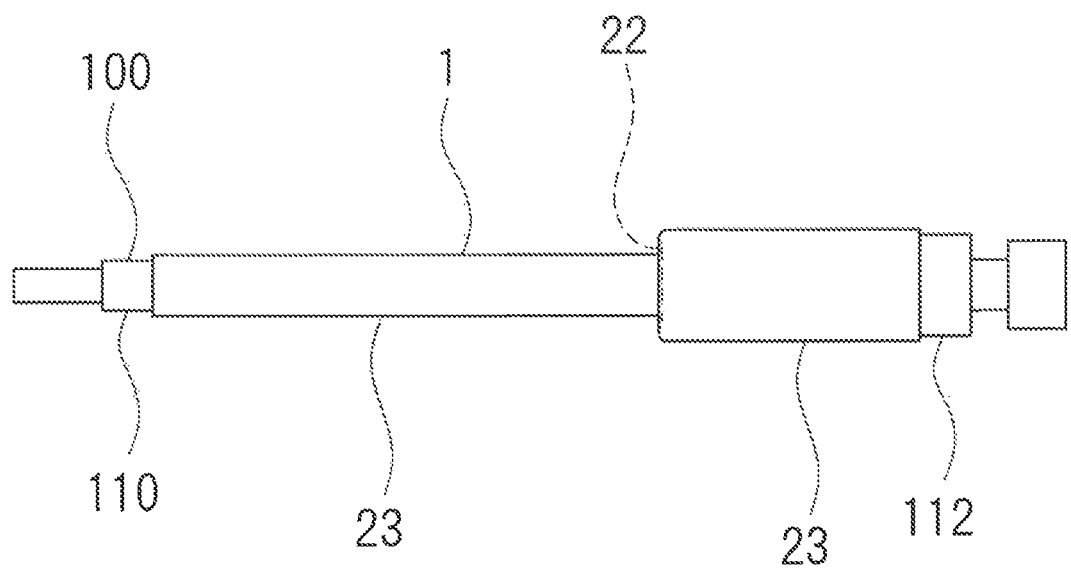

As shown in FIG. 13A, the silicon tube 102 can be attached over the entire length of the prepreg sheet 101. In this case, the entire outer surface 1a of the first cylindrical part 1 will be a smooth surface, as shown in FIG. 13B, and the outer surface 1a of the first cylindrical part 1 will consist of the third smooth portion 22 and the fourth smooth portion 23.

Figure 14:
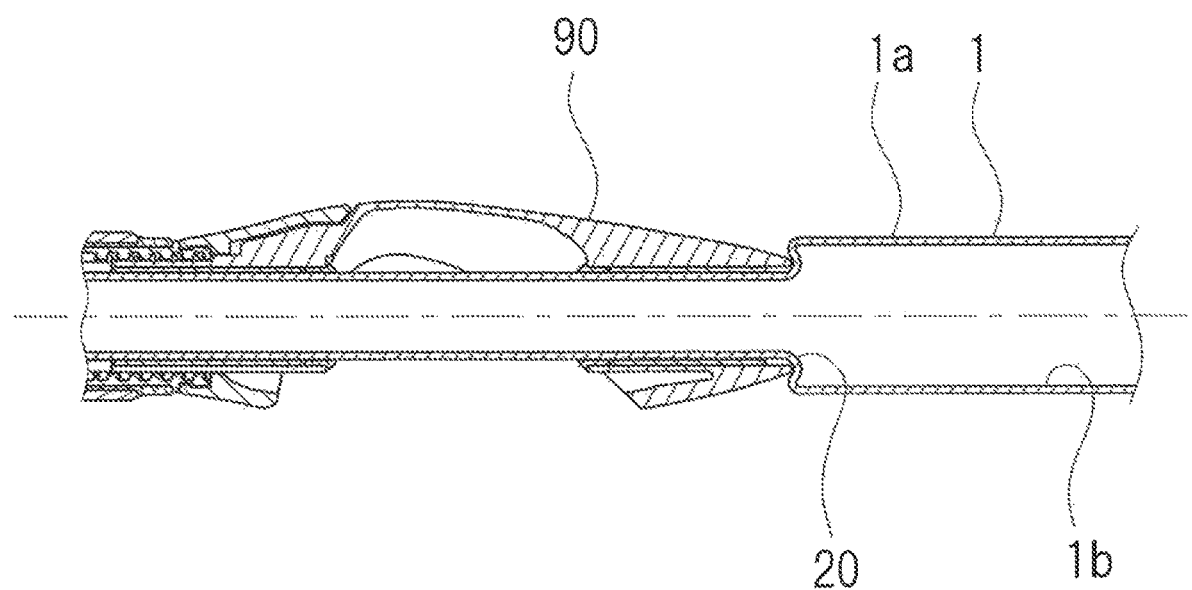
FIG. 14 shows a cross-sectional view of the main part of a fishing rod according to another embodiment of the present invention.

FIG. 14 shows a configuration with a cylindrical reel seat 90 attached to the first cylindrical part 1. The reel seat 90 is attached to the small diameter portion 10. The rear end of the reel seat 90 contacts and preferably engages with the axial lower portion 20. The axial lower portion 20 serves as a stopper, preventing the reel seat 90 from moving to the rear side and firmly securing the reel seat 90 to the cylindrical part 1. Since the large diameter portion 12 is located behind the reel seat 90, it can be gripped well without separately attaching a grip body made of EVA or other material at a position behind the reel seat 90.

Figure 15A:
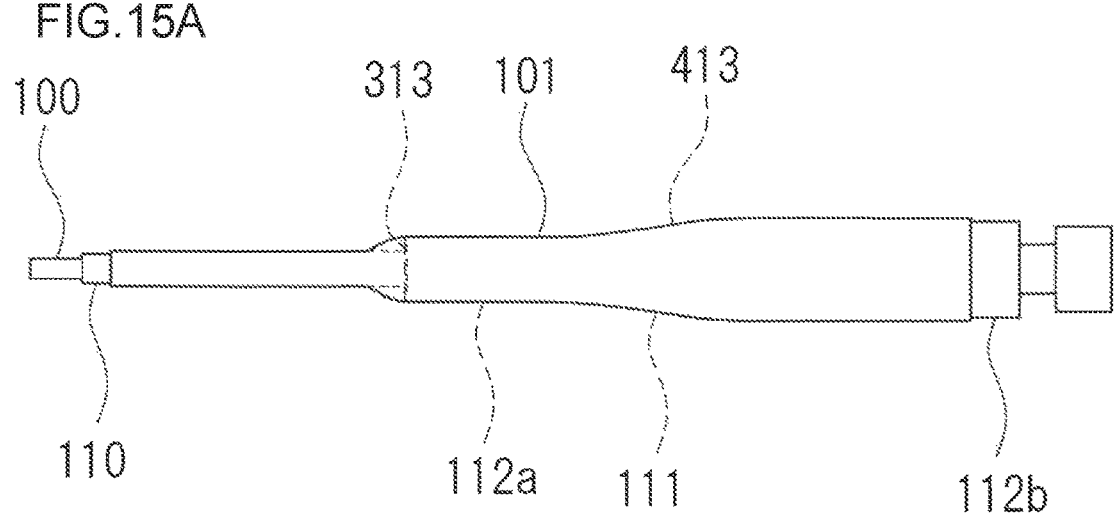
FIGS. 15A through 15C show the method of manufacturing the main part of a fishing rod according to another embodiment of the present invention.
Figure 15B:
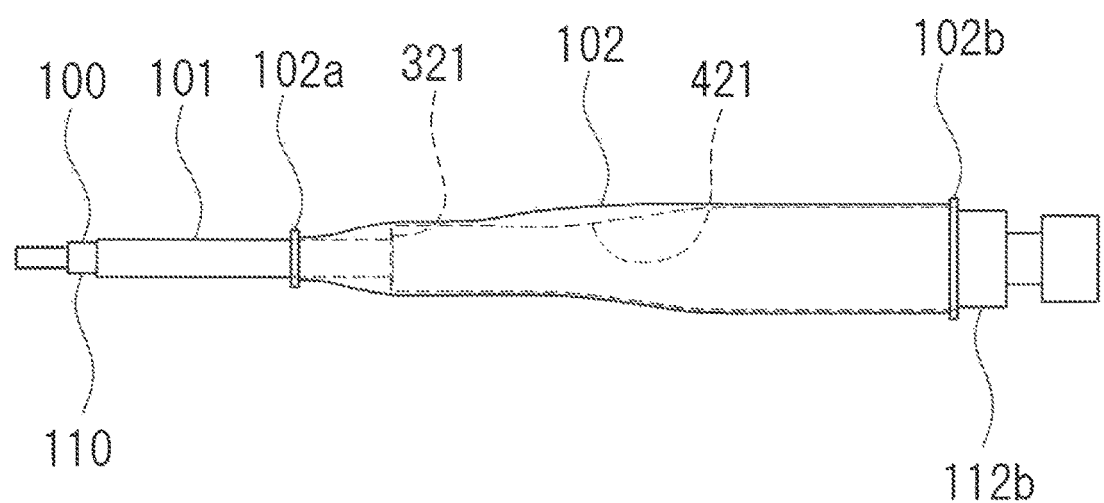
Figure 15C:
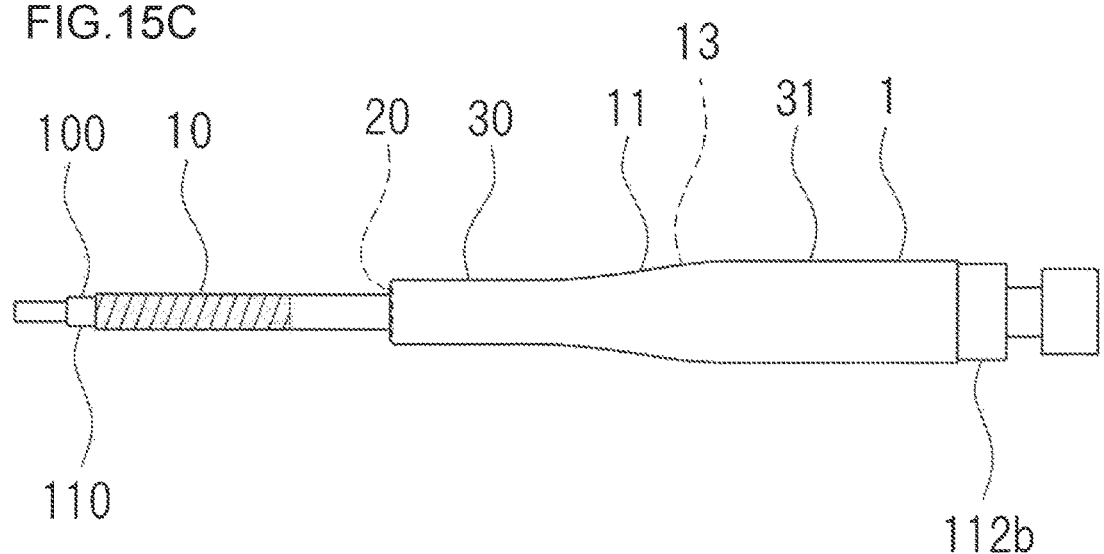
Figure 16:
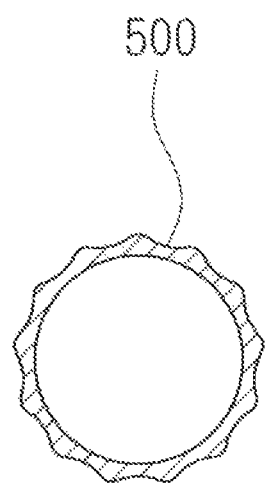
FIG. 16 shows a cross-sectional view of the main part of a conventional fishing rod.

In addition, as shown in FIGS. 15A-15C, the first cylindrical part 1 can have both the radial lower portion 13 and the axial lower portion 20. The axial lower portion 20 is provided on the front side of the radial lower portion 13, but the arrangement can be reversed. The first cylindrical part 1 in this embodiment has, in order from the front side, the small diameter portion 10, the axial lower portion 20, a front large-diameter portion 30, the enlarged diameter portion 11, and a rear large-diameter portion 31.

The mandrel 100 has the core small-diameter portion 110, a core front large-diameter portion 112a, the core enlarged-diameter portion 111, and a core rear large-diameter portion 112b, in order from the front side to the rear side along the shape of the first cylindrical part 1. Between the core small-diameter portion 110 and the core front large-diameter portion 112a, a core lower portion 313 is formed corresponding to the axial lower portion 20. Between the core enlarged-diameter portion 111 and the core rear large-diameter portion 112b, a core lower portion 413 is formed corresponding to the radial direction lower portion 13. The inner surface of the silicone tube 102 has a boss 321 corresponding to the axial lower portion 20 and a boss 421 corresponding to the radial lower portion 13.

REFERENCE SIGNS LIST

1 First cylindrical part
1a Outer surface
1b Inner surface
2 Second Cylindrical Part
10 Small diameter portion
11 Enlarged diameter portion
12 Large diameter portion
13 Radial lower portion
13a First concave outer surface
13b First convex inner surface
14 First spiral uneven portion
15 First smooth portion
16 Second smooth portion
20 Axial Lower portion
20a Second concave outer surface
20b Second convex inner surface
21 Second spiral uneven portion
22 Third smooth portion
23 Fourth smooth portion
30 Front large-diameter portion
31 Rear large-diameter portion
40 Third spiral uneven portion
90 Reel seat
100 Mandrel
101 Prepreg sheet
102 Silicon tube
102a First flange
102b Second flange
103 Tightening tape
110 Core small-diameter portion
111 Core enlarged-diameter portion
112 Core large-diameter portion
112a Core front large-diameter portion
112b Core rear large-diameter portion
113 Core lower portion
213 Core lower portion
313 Core lower portion
413 Core lower portion
121 Boss
221 Boss
321 Boss
421 Boss
500 Recess

What is claimed is:

1. A fishing rod comprising:
a rod body having a first generally cylindrical part comprised of wound, cured prepreg sheet of fiber-reinforced resin,
wherein the first generally cylindrical part has a sidewall portion that is recessed relative to surrounding sidewall, defined by a first concave outer surface and a first convex inner surface, the first concave outer surface being recessed inwardly in a radial direction, the first convex inner surface protruding convexly inwardly in the radial direction along the first concave outer surface, the first concave outer surface and the first convex inner surface extending along the first generally cylindrical part in an axial direction; and
the first generally cylindrical part further has at least two diameters along the axial direction thereof and a wall portion recessed in the axial direction into one of one or more larger-diameter portions of the first generally cylindrical part, the wall portion defined by a second concave outer surface recessed toward a rod tail side in the axial direction and a second convex inner surface protruding convexly along the second concave outer surface toward the rod tail side in the axial direction.

2. The fishing rod according to claim 1, wherein the radially recessed sidewall portion is disposed on one of said one or more larger-diameter portions.

3. The fishing rod according to claim 1, wherein the first generally cylindrical part has a first smooth portion on the first concave outer surface.

4. The fishing rod according to claim 3, wherein the first generally cylindrical part has a second smooth portion at least partially on an outer surface thereof such that the second smooth portion does not coincide with the first concave outer surface.

5. The fishing rod according to claim 3, wherein the first generally cylindrical part has a first spiral uneven portion at least partially on the outer surface thereof such that the first spiral uneven portion does not coincide with the first concave outer surface.

6. The fishing rod according to claim 5, further comprising a second generally cylindrical part disposed adjacent to the first generally cylindrical part in the axial direction and having an additional spiral uneven portion on an outer surface thereof.

7. The fishing rod according to claim 1, further comprising a second cylindrical part disposed adjacent to the first generally cylindrical part in the axial direction and having a spiral uneven portion on an outer surface thereof.

8. The fishing rod according to claim 1, wherein the recessed sidewall portion is disposed closer to the rod tail side in the axial direction than the wall portion recessed in the axial direction.

9. The fishing rod according to claim 1, wherein the second concave outer surface and the second concave inner surface extend circumferentially around one of said one or more larger-diameter portions.

10. A fishing rod comprising:

a rod body having a first generally cylindrical part comprised of wound, cured prepreg sheet of fiber-reinforced resin, wherein the first generally cylindrical part has one or more diameters along an axial direction thereof and a wall portion recessed in the axial direction into a larger-diameter portion of the first generally cylindrical part, the wall portion defined by a concave outer surface and a convex inner surface, the concave outer surface being recessed toward a rod tail side in the axial direction, the convex inner surface protruding convexly along the concave outer surface toward the rod tail side in the axial direction, the concave outer surface and the convex inner surface extending circumferentially around the larger-diameter portion.

11. The fishing rod according to claim 10, wherein the first generally cylindrical part has a first diameter portion and a second diameter portion, a diameter of the first diameter portion being smaller than a diameter of the second diameter portion, and the wall portion recessed in the axial direction is disposed at a boundary between the first diameter portion and the second diameter portion.

12. The fishing rod according to claim 10, wherein the first generally cylindrical part has a first smooth portion on the concave outer surface.

13. The fishing rod according to claim 12, wherein the first generally cylindrical part has a second smooth portion at least partially on an outer surface thereof such that the second smooth portion does not coincide with the concave outer surface.

14. The fishing rod according to claim 12, wherein the first generally cylindrical part has a spiral uneven portion at least partially on the outer surface thereof such that the spiral uneven portion does not coincide with the concave outer surface.

* * * * *